(12) United States Patent
Maltsev et al.

(10) Patent No.: US 8,913,533 B2
(45) Date of Patent: *Dec. 16, 2014

(54) MODULATION SCHEME FOR ORTHOGONAL FREQUENCY DIVISION MULTIPLEXING SYSTEMS OR THE LIKE

(75) Inventors: Alexander A. Maltsev, Nizhny Novgorod (RU); Ali S. Sadri, San Diego, CA (US); Alexei V. Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,233

(22) Filed: Jun. 12, 2012

(65) Prior Publication Data
US 2012/0250778 A1 Oct. 4, 2012

Related U.S. Application Data

(63) Continuation of application No. 12/645,914, filed on Dec. 23, 2009, now Pat. No. 8,218,464, which is a continuation of application No. 10/664,218, filed on Sep. 17, 2003, now Pat. No. 7,688,766.

(51) Int. Cl.
*H04J 3/16* (2006.01)
*H04L 5/00* (2006.01)

(52) U.S. Cl.
CPC ............ *H04L 5/0046* (2013.01); *H04L 5/0007* (2013.01); *H04L 5/006* (2013.01)
USPC .......................................... 370/310; 370/465

(58) Field of Classification Search
None
See application file for complete search history.

(56) References Cited

U.S. PATENT DOCUMENTS

| | | | |
|---|---|---|---|
| 5,400,322 A | 3/1995 | Hunt et al. | |
| 6,181,714 B1 * | 1/2001 | Isaksson et al. | 370/491 |
| 6,732,281 B1 | 5/2004 | Mantri et al. | |
| 7,245,879 B2 | 7/2007 | Sadri et al. | |
| 7,286,609 B2 | 10/2007 | Maltsev et al. | |
| 7,321,614 B2 | 1/2008 | Jacobsen et al. | |
| 7,688,766 B2 * | 3/2010 | Maltsev et al. | 370/310 |
| 8,218,464 B2 * | 7/2012 | Maltsev et al. | 370/310 |
| 2001/0031014 A1 | 10/2001 | Subramanian et al. | |
| 2002/0155835 A1 | 10/2002 | Pankaj et al. | |
| 2003/0012220 A1 | 1/2003 | Kim et al. | |
| 2003/0021243 A1 * | 1/2003 | Hamalainen | 370/329 |

(Continued)

FOREIGN PATENT DOCUMENTS

| | | |
|---|---|---|
| CN | 1488206 | 4/2004 |
| CN | 1496614 | 5/2004 |

OTHER PUBLICATIONS

Office Action for U.S. Appl. No. 10/664,218 mailed May 30, 2007, 6 pgs.

(Continued)

*Primary Examiner* — Kevin C Harper
(74) *Attorney, Agent, or Firm* — Blakely, Sokoloff, Taylor & Zafman LLP

(57) ABSTRACT

Briefly, in accordance with one embodiment of the invention, bit and power loading may be utilized to select a modulation rate and subcarrier power scaling based on channel state information. As a result, a higher data rate may be utilized for a given signal-to-noise ratio while maintaining a constant bit error rate.

16 Claims, 5 Drawing Sheets

(56) References Cited

U.S. PATENT DOCUMENTS

| | | | |
|---|---|---|---|
| 2003/0043732 A1 | 3/2003 | Walton et al. | |
| 2003/0043929 A1 | 3/2003 | Sampath | |
| 2003/0108013 A1 | 6/2003 | Hwang et al. | |
| 2003/0108027 A1* | 6/2003 | Kim et al. | 370/345 |
| 2003/0126536 A1* | 7/2003 | Gollamudi et al. | 714/748 |
| 2003/0147476 A1 | 8/2003 | Ma et al. | |
| 2004/0001429 A1* | 1/2004 | Ma et al. | 370/210 |
| 2004/0022180 A1 | 2/2004 | Stolpman et al. | |
| 2004/0196780 A1* | 10/2004 | Chin et al. | 370/208 |
| 2004/0203992 A1 | 10/2004 | Yun | |
| 2011/0299447 A1* | 12/2011 | Rudolf et al. | 370/311 |

OTHER PUBLICATIONS

Office Action for European Patent Application No. 04 788 805.2-2415 mailed Oct. 22, 2007, 6 pgs.

Second Office Action for Chinese Patent Application No. 200480026550.5 (PCT/US2004/030390) mailed Jun. 17, 2009, 9 pgs.

First Office Action for Chinese Patent Application No. 200480026550.5 (PCT/US2004/030390) mailed Nov. 17, 2008, 24 pgs.

Search Report and Written Opinion for PCT Int'l Patent Application No. PCT/2004/030390 mailed Feb. 18, 2005, 7 pgs.

Int'l Preliminary Report on Patentability Chapter 1 for PCT Int'l Patent Application No. PCT/2004/030390 mailed Mar. 30, 2006, 9 pgs.

Notice of Allowance for U.S. Appl. No. 10/664,218 mailed Nov. 2, 2009, 6 pgs.

Third Office Action for Chinese Patent Application No. 200480026550.5 (PCT/US2004/030390) mailed Jul. 29, 2010, 8 pgs.

Lai, Sai K., et al., "Adaptive Trellis Coded MQAM and Power Optimization for OFDM Transmission", Vehicular Technology Conference, 1999 IEE 49th Houstan, TX, USA May 16-20, 1999, Piscataway, NJ, USA, IEEE, US, vol. 1, May 16, 1999, pp. 290-294.

Zhen, Li , et al., "A Modified Sub-Optimum Adaptive Bit and Power Allocation Algorithm in Wideband OFDM System", CCECE 2003. Canadian Conference on Electrical and Computer Engineering. Montreal, Canada, May 4-7, 2003, Canadian Conference on Electrical and Computer Engineering, NY, NY, IEEE, US, vol. 3 of 3, May 4-7, 2003, pp. 1589-1592.

First Office Action from Chinese Patent Application No. 201210196398.1, mailed May 22, 2014, 17 pages.

Office Action for U.S. Appl. No. 12/645,914 mailed Sep. 17, 2010, 8 pages.

Office Action for U.S. Appl. No. 12/645,914 mailed May 26, 2011, 10 pages.

Office Action for U.S. Appl. No. 12/645,914 mailed Nov. 21, 2011, 5 pages.

Final Office Action for U.S. Appl. No. 12/645,914 mailed Feb. 3, 2011, 6 pages.

Notice of Allowance for U.S. Appl. No. 12/645,914 mailed Mar. 12, 2012, 5 pages.

Office Action for U.S. Appl. No. 10/664,218 mailed Jun. 13, 2008, 5 pages.

Office Action for U.S. Appl. No. 10/664,218 mailed Nov. 25, 2008, 7 pages.

Office Action for U.S. Appl. No. 10/664,218 mailed Mar. 18, 2009, 4 pages.

Final Office Action for U.S. Appl. No. 10/664,218 mailed Feb. 5, 2008, 6 pages.

* cited by examiner

MODULATION SCHEME FOR ORTHOGONAL FREQUENCY DIVISION MULTIPLEXING SYSTEMS OR THE LIKE

PRIORITY

This application is a continuation of U.S. patent application Ser. No. 12/645,914 filed Dec. 23, 2009, now U.S. Pat. No. 8,218,464 entitled, "MODULATION SCHEME FOR ORTHOGONAL FREQUENCY DIVISION MULTIPLEXING SYSTEMS OR THE LIKE" which a continuation of U.S. patent application Ser. No. 10/664,218, filed Sep. 17, 2003, now U.S. Pat. No. 7,688,766 entitled, "MODULATION SCHEME FOR ORTHOGONAL FREQUENCY DIVISION MULTIPLEXING SYSTEMS OR THE LIKE," the entire contents of which are hereby incorporated by reference.

BACKGROUND

In typical orthogonal frequency division multiplexing (OFDM) systems, different modulation schemes may be utilized to provide different coding rates based on a signal-to-noise ratio experienced in a given channel. However, most such systems utilize coarse increments of throughput for a given change in signal-to-noise ratio, typically 6 dB increments. It would be desirable to provide less coarse throughput increments without over a smaller change in signal-to-noise ratio without requiring additional redundancy in the system so that a higher modulation rate may be utilized for a given signal-to-noise ratio, while maintaining a fixed bit error rate for a higher number of subcarriers of each OFDM symbol.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
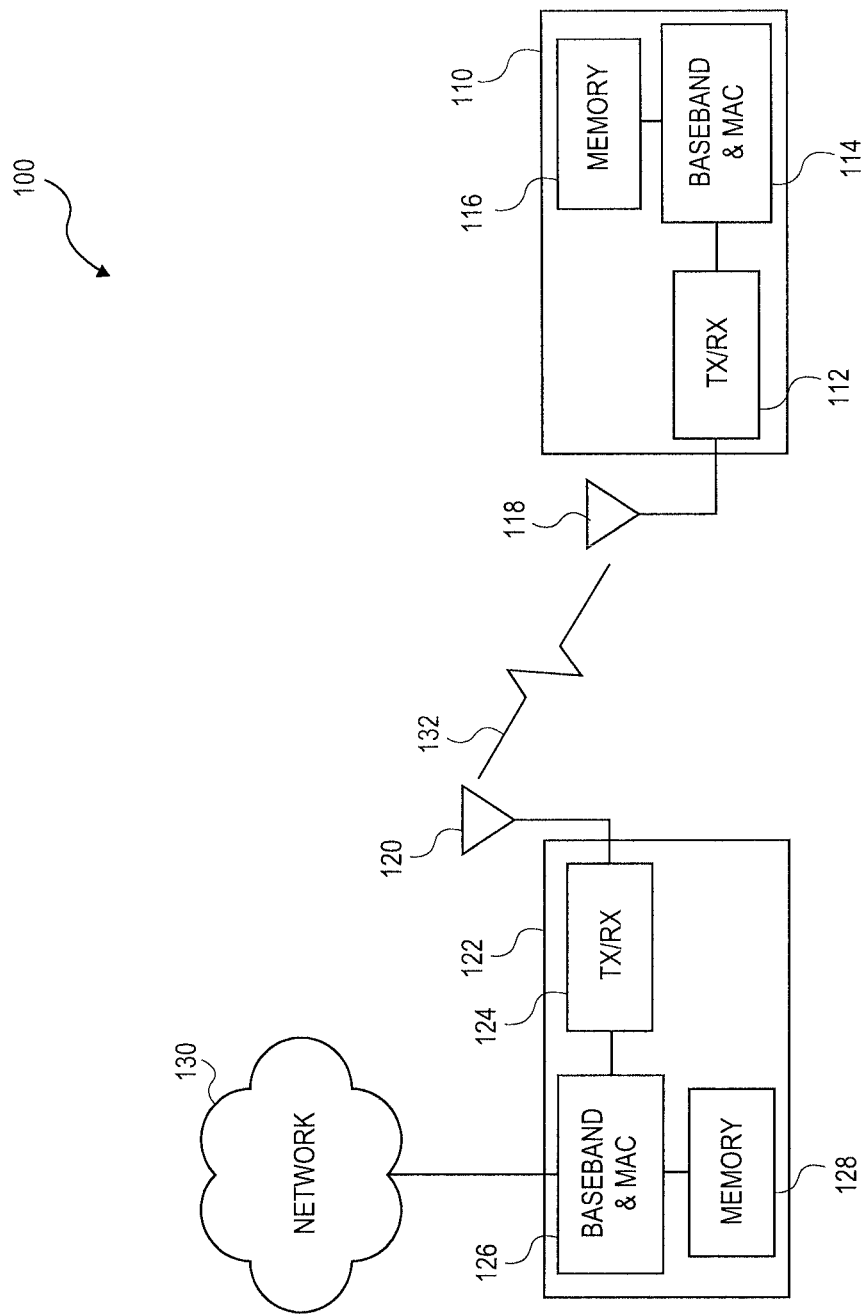
FIG. 1 is a block diagram of a wireless local area network system in accordance with one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer, computing platform, or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Referring now to FIG. 1, a wireless local area network communication system in accordance with one embodiment of the present invention will be discussed. In the WLAN communications system 100 shown in FIG. 1, a mobile unit 110 may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (IEEE) standard such as IEEE 802.11a, IEEE 802.11b, HiperLAN-II, and so on, although the scope of the invention is not limited in this respect. In another embodiment, communication between mobile unit 110 and access point 122 may be at least partially implemented via a cellular communication network compliant with a 3GPP standard, although the scope of the invention is not limited in this respect.

Figure 2:
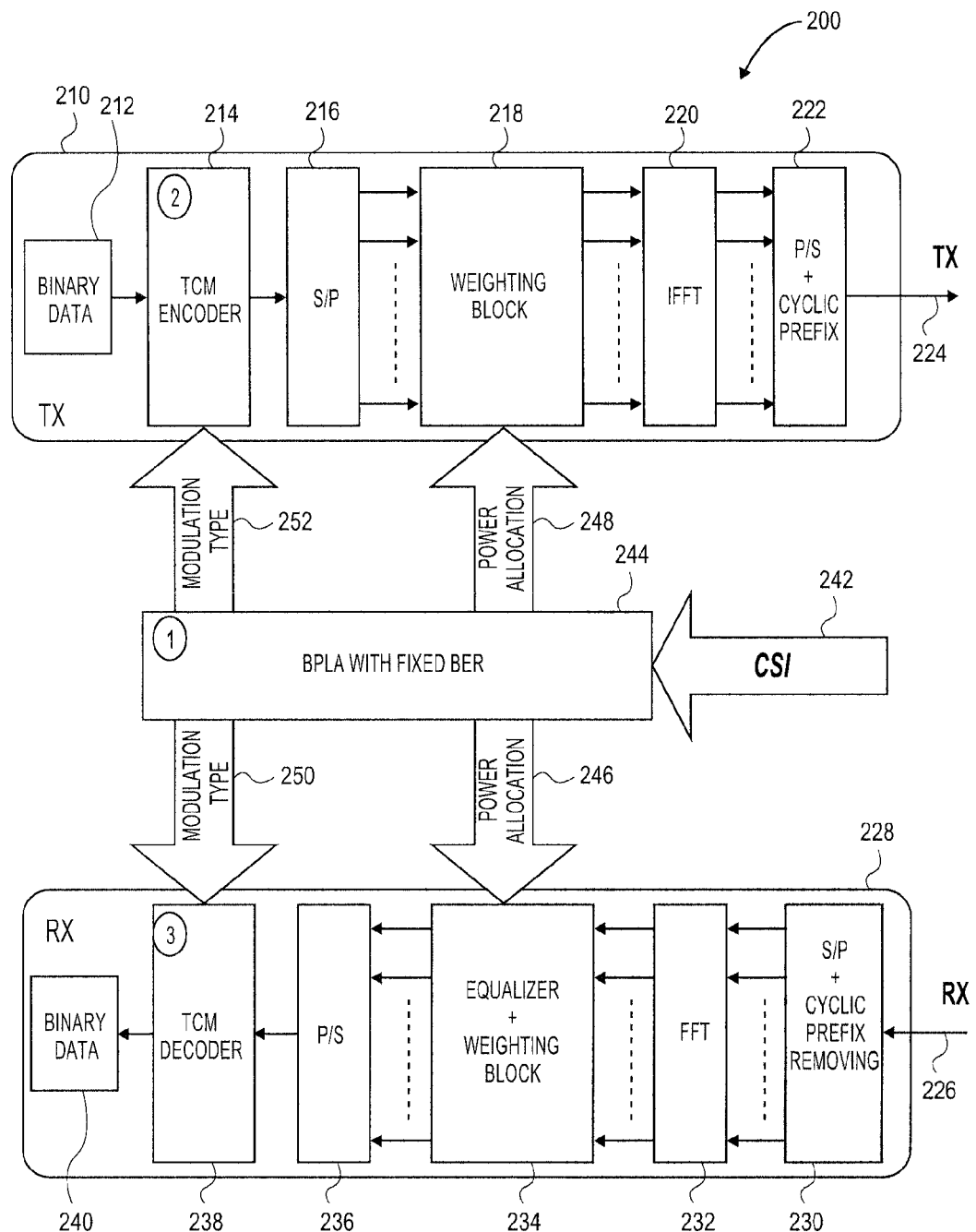
FIG. 2 is a block diagram of an orthogonal frequency division multiplexing transceiver in accordance with one embodiment of the present invention.

Referring now to FIG. 2, a transceiver for an orthogonal frequency division multiplexing system in accordance with one embodiment of the invention. The transceiver 200 of FIG. 2 may correspond, for example, to the transceiver 112 of mobile unit 116 or to the transceiver 124 of access point 122 of FIG. 1, although the scope of the invention is not limited in this respect. The transceiver 200 shown in FIG. 2 may include a transmitter circuit 210 and a receiver circuit 228. In addition, transceiver 200 may include a bit and power loading circuit 244. As shown in FIG. 2, binary data 212 is provided to a trellis coded modulation (TCM) encoder 214 which may provide an output to a serial-to-parallel converter 216. The parallel data output of serial-to-parallel converter 216 may be passed through a weighting block 218 and then through an inverse fast Fourier transform (IFFT) block 220. The output of IFFT block 220 may then be passed through a parallel-to-serial converter block 222 where a cyclic prefix may be appended to the data in accordance with a orthogonal frequency division system, although the scope of the invention is not limited in this respect. The transmitter 210 may output OFDM data 224 to be transmitted to a remote device.

Receiver 228 may receive OFDM data 226 from a remote device which may be converted from a series signal into a parallel signal via serial-to-parallel converter block 230 where the cyclic prefix may be removed from the received OFDM data 226. The parallel data from serial-to-parallel converter block 230 may then be passed through a fast Fourier transform (FFT) block 232, the output of which math then be passed through an equalizer and weighting block 234. The output of equalizer and weighting block 234 may be passed through a parallel-to-serial convert block 236, which may provide data to a trellis coded modulation (TCM) decoder 238. The decoded output provided by TCM decoder 238 is the desired binary data 240, although the scope of the invention is not limited in this respect.

In accordance with one embodiment of the invention, bit and power loading block 244 may implement a bit and power loading algorithm (BPLA) based on received channel state information (CSI) 242 provided to the input of bit and power loading block 244. In one embodiment of the invention, the channel state information (CSI) may be obtained by transceiver 200 from a remote device or a remote user. The remote user may calculate channel state information by processing training symbols transmitted by transceiver 210 during a previous packet transmission. In one particular embodiment of the invention, channel state information may consist of a channel transfer function estimate in the frequency domain or a channel response function estimate in the time domain. In an alternative embodiment of the invention, a remote user may process channel function estimates itself using a bit and power loading block, and may then transmit power allocation and modulation type instructions as the ready to use channel state information back to the original transmitting device. Based at least in part on obtained CSI (Channel State Information) 242, bit and power loading block 244 may determine which subcarriers, if any, that should be turned off, and may calculate the power values and the rates, or signal constellations, for the active subcarriers. Such information may be provided by bit and power loading block 244 to transmitter 210 and receiver 228 by providing power allocation information 246 and 248 to equalizer and weighting block 234 and to weighting block 218, and by providing modulation type information 250 and 252 to TCM decoder 238 and TCM encoder 214 as shown in FIG. 2, although the scope of the invention is not limited in this respect.

In one embodiment of the invention, channel state information 242 may be available at the transmitter side. The transmitter side in one embodiment may be defined as being a first device that transmits data to a remote device, where the remote device may transmit some channel state information 242 back to the first device, although the scope of the invention is not limited in this respect. For example, access point 122 may transmit a signal, which may contain training symbols, to mobile unit 110, and then mobile unit may transmit the channel state information 242 back to access point 122 so that transceiver 124 of access point 122 may utilize the channel state information 242 in accordance with the present invention, although the scope of the invention is not limited in this respect. In such a case, access point 122 may be considered as the transmitter side, and mobile unit 110 may be considered the receiver side, although the scope of the invention is not limited in this respect. In response to the channel state information 242, transmitter 210 may turn off one or more bad subcarriers, where a bad subcarrier may be defined as a subcarrier of the OFDM signal having a lower gain, and may then divide the remaining active, or turned on, subcarriers into one or more fixed subsets. In a subset, subset carriers may be appointed the same rate as a combination of modulation and encoding at TCM encoder 214 and TCM decoder 238 and then rescaled via weighting block 218 and equalizer and weighting block 234 to provide weighted subcarrier powers, via bit and power loading block 244. In one embodiment of the invention, rescaling of subcarrier powers may be performed by bit and power loading block 244 so as to maintain a fixed bit error rate (BER) at the receiver side, for example at mobile unit 110 for the subcarriers in the subcarrier subsets. In a particular embodiment, the bit and power loading scheme in combination with a trellis coded modulation scheme to provide a fixed bit error rate may be optimized for an additive white Gaussian noise (AWGN) channel, and may thus mitigate an effect of channels having different frequency selective fading, although the scope of the invention is not limited in this respect.

Figure 3:
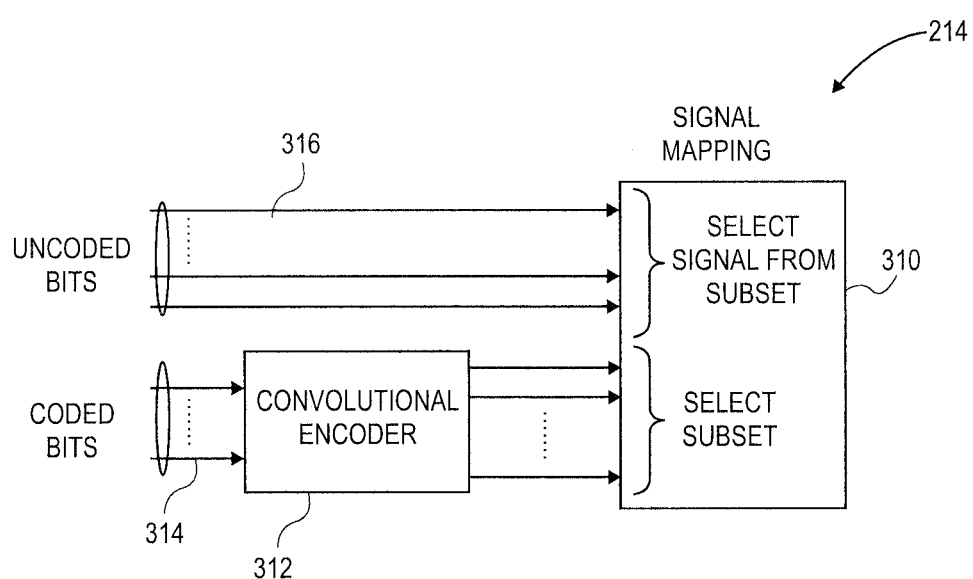
FIG. 3 is a block diagram of an encoder modulator in accordance with one embodiment of the present invention.

Referring now to FIG. 3, a block diagram of a trellis coded modulation encoder in accordance with the present invention will be discussed. Based on the information obtained from bit and power loading block 244 as shown in FIG. 2, TCM encoder 214 may subsequently extract from binary data 212 a desired number of bits for mapping each active subcarrier, and then partitions a block of bits of binary data 212 into coded bits 314 and uncoded bits 316. The coded bits 314 may be passed through a convolutional encoder 312, whereas the uncoded bits 316 may be utilized to determine a signal constellation point for corresponding active subcarriers within the subset selected by convolutional encoder output. As shown in FIG. 3, a signal mapping block 310 may select the constellation subset based at least in part on the output of convolutional encoder 312, and select the signal constellation point based at least in part on the uncoded bits 316, although the scope of the invention is not limited in this respect.

Figure 4:
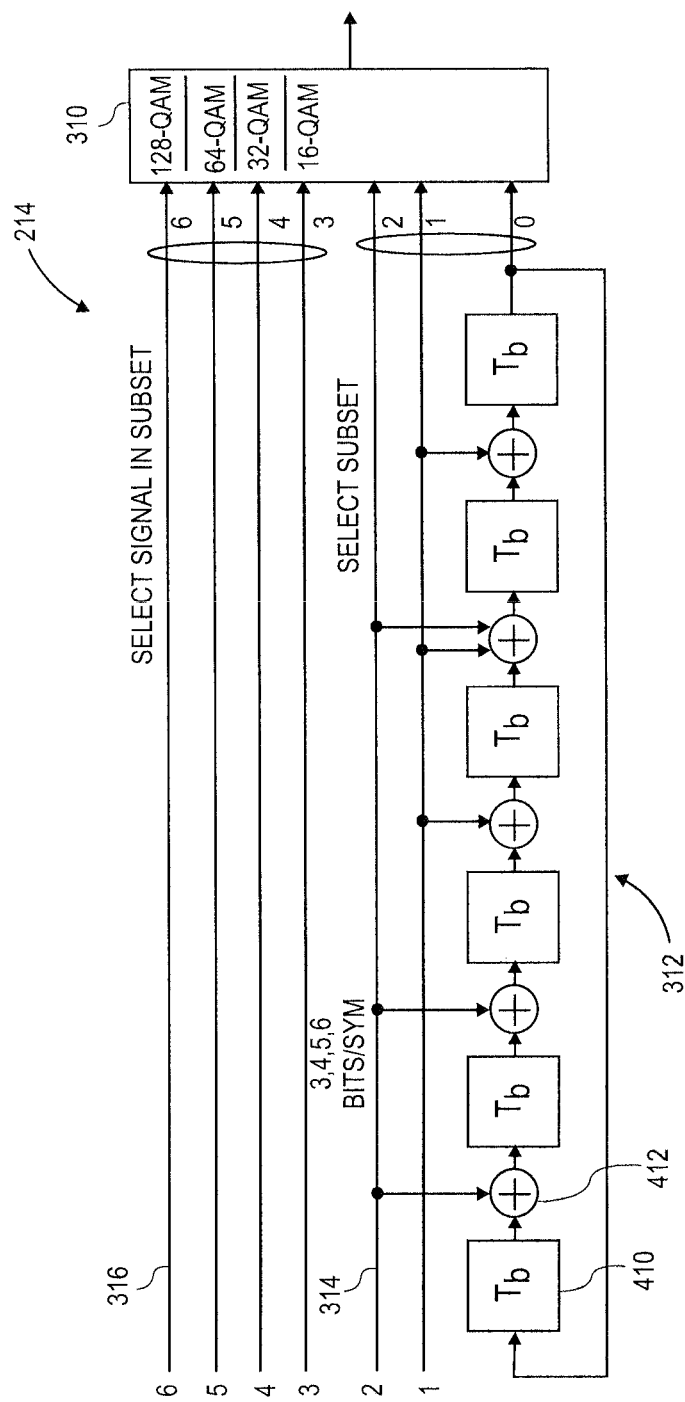
FIG. 4 is a block diagram of a multi-rate trellis coded modulation encoder in accordance with an embodiment of the present invention.

Referring now to FIG. 4, a block diagram of a trellis coded modulation encoder in accordance with one embodiment of the present invention will be discussed, further showing details of a convolutional encoder and signal mapping block. As shown in FIG. 4, convolutional encoder 312 in one embodiment may comprise a combination of bit time delays 410 and combiners 412 that may receive the coded bits 314. In one particular embodiment of the invention, TCM encoder 214 may be a 64-state TCM encoder arranged to be optimized for an additive white Gaussian noise (AWGN) channel with quadrature amplitude modulations (QAM) of 16-QAM, 32-QAM, 64-QAM, and 128-QAM. The signal mapping block 310 may select from one of the available modulation types.

At the receiver block 228 as shown in FIG. 2, TCM decoder 238 may find the allowed signal point sequence, which is closest in Euclidian distance to the received sequence of signals. In one embodiment of the invention, a Viterbi algorithm may be used to determine the closest signal sequence as follows. At each trellis branch, receiver 228 may compare the received signal with every signal allowed for that branch. The closest signal point may be saved in memory until final subsets are determined. The branch then may be labeled with the metric proportional to the Euclidian distance between these two signal points. The Viterbi algorithm then may be applied to determine a maximum likelihood path in the trellis to determine the subset sequence. After the subset sequence is determined, the appropriate delayed subset elements, the stored closest signal points, may be found and converted to output binary data 240, although the scope of the invention is not limited in this respect.

Figure 5:
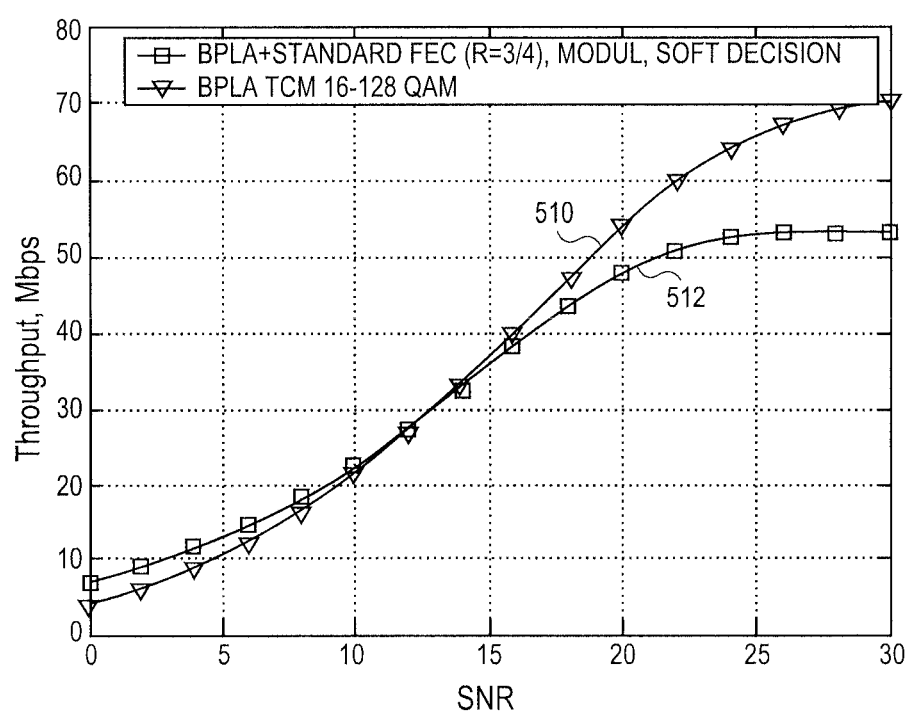
FIG. 5 is a diagram of a throughput verses signal-to-noise ratio of a transceiver in accordance with one embodiment of the present invention.

Referring now to FIG. 5, a diagram of a throughput verses signal-to-noise ratio of a transceiver in accordance with one embodiment of the present invention will be discussed. In accordance with one embodiment of the invention, throughputs for orthogonal frequency division multiplexing in megabits per second are shown on the vertical axis and signal-to-noise ratio in decibels (dB) is shown on the horizontal axis. The throughput for OFDM using transceiver 200 in which trellis coded modulation and bit and power loading is utilized is shown at 510, compared with standard convolutional coding, for example as utilized in the IEEE 802.11 a standard, with code rate R=¾ is shown at 512. In one embodiment of the invention, both coding schemes may utilize the same bit and power loading algorithm, although the scope of the invention is not limited in this respect. As shown in FIG. 5, where transceiver 200 utilizes trellis coded modulation with bit and power loading in accordance with the present invention, at SNR of 13 dB or greater, a performance gain may be provided, with little or no loss in performance for SNR less than 10 dB when using 16-QAM as a minimal order modulation for trellis coded modulation, although the scope of the invention is not limited in this respect.

Although the invention has been described with a certain degree of particularity, it should be recognized that elements thereof may be altered by persons skilled in the art without departing from the spirit and scope of the invention. It is believed that the modulation scheme for orthogonal frequency division multiplexing systems or the like of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form hereinbefore described being merely an explanatory embodiment thereof, and further without providing substantial change thereto. It is the intention of the claims to encompass and include such changes.

What is claimed is:

1. A method performed by a base station in a wireless network comprising:
    responsive to reception from a mobile device of channel state information derived by the mobile device from received symbols, transmitting instructions to the mobile device; and
    wherein instructions are to cause the mobile device to rescale transmission parameters based on the instructions and rescaling transmission parameters comprises calculating values and setting modulation rates for active subcarriers, wherein the instructions further cause the mobile device to turn off one or more bad subcarriers, where a bad subcarrier is a subcarrier having a lower gain, and to divide the remaining active subcarriers into one or more fixed subsets.

2. The method of claim 1, further comprising responsive to the reception from the mobile device of channel state information, transmitting by the base station modulation type instructions to cause the mobile device to adapt a modulation and coding scheme.

3. The method of claim 1 wherein the rescaling of transmission parameters maintains a constant error rate for at least one or more subcarriers of a signal.

4. The method of claim 3 wherein the constant error rate comprises a constant bit error rate (BER).

5. An article comprising a non-transitory storage medium having stored thereon instructions that, when executed, by a computing platform, result in:
    responsive to reception from a mobile device of channel state information derived by the mobile device from received symbols, transmitting instructions to the mobile device; and
    wherein instructions are to cause the mobile device to rescale transmission parameters based on the instructions and rescaling transmission parameters comprises calculating values and setting modulation rates for active subcarriers, wherein the instructions further cause the mobile device to turn off one or more bad subcarriers, where a bad subcarrier is a subcarrier having a lower gain, and to divide the remaining active subcarriers into one or more fixed subsets.

6. The article of claim 5, further comprising responsive to channel state information obtained from a mobile device based on symbols received by the mobile device, causing the base station to transmit modulation type instructions to cause the mobile device to adapt a modulation and coding scheme.

7. The article of claim 6, wherein the constant error rate comprises a constant bit error rate (BER).

8. A base station comprising:
    at least one antenna;
    at least one receiver;
    at least one transmitter configured to transmit power control instructions via the at least one antenna to a mobile device in response to reception by the at least one receiver from the mobile device of channel state information derived by the mobile device from received symbols; and
    wherein the instructions are to cause the mobile device to rescale transmission parameters based on the power control instructions, the rescaling transmission parameters comprises calculating values and modulation rates for active subcarriers, wherein the instructions further cause the mobile device to turn off one or more bad subcarriers, where a bad subcarrier is a subcarrier having a lower gain, and to divide the remaining active subcarriers into one or more fixed subsets.

9. The base station of 8, wherein the base station is further configured to transmit, in responsive to the reception from the mobile device of channel state information, modulation type instructions to cause the mobile device to adapt a modulation and coding scheme.

10. The base station of claim 9, wherein the rescaling of transmission parameters maintains a constant error rate for at least one or more subcarriers of a signal.

11. The base station of claim 10, wherein the constant error rate comprises a constant bit error rate (BER).

12. A mobile unit comprising:
    an antenna;
    a wireless transceiver coupled the antenna;
    a processor to provide baseband and media access control (MAC) processing functions, the processor further configured to calculate channel state information (CSI) derived by symbols received by the mobile unit; and
    wherein the mobile unit is configured to transmit to a base station the CSI and rescale transmission parameters based on instructions received by the mobile unit from the base station, wherein rescaling transmission parameters comprises calculating values and modulation rates for active subcarriers, wherein the instructions further cause the mobile device to turn off one or more bad subcarriers, where a bad subcarrier is a subcarrier having a lower gain, and to divide the remaining active subcarriers into one or more fixed subsets.

13. The mobile unit of claim 12, wherein responsive to the reception from the base station of modulation type instructions, adapting by the mobile unit of a modulation and coding scheme.

14. The mobile unit of claim 12, wherein the rescaling of transmission parameters maintains a constant error rate for at least one or more subcarriers of a signal.

15. The mobile of claim 10, wherein the constant error rate comprises a constant bit error rate (BER).

16. The article of claim 5, wherein the rescaling of transmission parameters maintains a constant error rate for at least one or more subcarriers of a signal.

* * * * *